Patented Aug. 5, 1941

2,251,292

UNITED STATES PATENT OFFICE 2,251,292

PRODUCTION OF TETRAHYDROFURANES

Walter Reppe, Ludwigshafen-on-the-Rhine, Germany, assignor, by mesne assignments, to General Aniline & Film Corporation, New York, N. Y., a corporation of Delaware No Drawing. Application October 4, 1938, Serial No. 233,247. In Germany October 29, 1937

3 Claims. (Cl. 260—345)

The present invention relates to the production of tetrahydrofuranes.

It is already known that by heating 1.4-butylene-glycol with sulphuric acid or hydrochloric acid, tetrahydrofurane is obtained. Undesirable side-reactions occur, however, so that the yields of tetrahydrofurane are not satisfactory.

I have now found that tetrahydrofuranes are obtained in practically quantitative yields by distilling 1.4-butylene-glycols in the presence of oxygen acids of phosphorus. The reaction may be carried out by heating a mixture of the 1.4-butylene-glycol with phosphoric acid so that a mixture of tetrahydrofurane and water distils off.

The process is suitable for the known 1.4-butylene-glycol in the same way as for its alkyl, aryl or aralkyl substitution products. Suitable oxygen acids of phosphorus are in particular ortho-, meta- and pyrophosphoric acids.

By the reaction there are obtained, depending on the working conditions, tetrahydrofuranes mixed with more or less of the water of reaction which compounds may be obtained in pure form by treatment with dehydrating agents, as for example anhydrous calcium chloride, potassium carbonate, or anhydrous sodium sulphate.

The tetrahydrofuranes obtained are valuable intermediate products for various chemical reactions.

The following example will further illustrate how this invention may be carried out in practice, but the invention is not restricted to this example. The parts are by weight.

*Example*

100 parts of 80 per cent ortho-phosphoric acid are added to 1000 parts of 1.4-butylene-glycol in a stirring vessel, the whole being heated to 165° C. At the said temperature, the splitting off of water commences and there distils off a mixture of tetrahydrofurane with water. Fresh 1.4-butylene-glycol is allowed to flow in at a rate corresponding substantially to the rate at which the reaction products distil off.

During the course of the reaction it is preferable to raise the temperature to about 185° C. The yields of anhydrous tetra hydrofurane having a boiling point of from 65° to 67° C. are practically quantitative. The product is miscible in any proportions with water and has a refractive index of $n_D^{20}=1.4065$, a density $d_{20}=0.8886$ and a mol refraction $R_D=19.94$ (according to Lorentz-Lorenz) which agrees well with the value $R_D=20.11$ calculated from the atom refractions. It may be isolated from the aqueous solution by adding thereto anhydrous sodium sulphate, removing the non-aqueous layer formed, and, if desired, further distillation.

What I claim is:

1. In the production of tetrahydrofuranes from 1.4-butylene-glycols the step which consists in heating a liquid 1.4-butylene-glycol in the presence of an oxygen acid of phosphorus selected from the group consisting of ortho-, pyro- and meta-phosphoric acid at a temperature suitable to produce a distilling mixture of tetrahydrofurane and water.

2. In the production of tetrahydrofuranes from 1.4-butylene-glycols the step which consists in heating a liquid 1.4-butylene-glycol in the presence of ortho phosphoric acid at a temperature suitable to produce a distilling mixture of tetrahydrofurane and water.

3. In the production of tetrahydrofuranes from 1.4-butylene-glycols the step which consists in heating a liquid 1.4-butylene-glycol in the presence of ortho phosphoric acid at a temperature suitable to produce a distilling mixture of tetrahydrofurane and water while adding 1.4-butylene-glycol at a rate corresponding substantially to that at which the reaction products distil off.

WALTER REPPE.